United States Patent [19]

Fukamoto

[11] Patent Number: 5,320,575

[45] Date of Patent: Jun. 14, 1994

[54] MACHINE FOR AUTOMATICALLY CUTTING SHELLS OF CRAB LEGS

[75] Inventor: Noboru Fukamoto, Shizuoka, Japan

[73] Assignee: Akiyama Machinery Co., Ltd., Shizuoka, Japan

[21] Appl. No.: 998,663

[22] Filed: Dec. 30, 1992

[30] Foreign Application Priority Data

Jun. 19, 1992 [JP] Japan ................. 4-049119[U]

[51] Int. Cl.⁵ ............................................. A22C 29/02
[52] U.S. Cl. ......................................... 452/1; 83/425.2
[58] Field of Search ............................. 452/1; 83/425.2

[56] References Cited

U.S. PATENT DOCUMENTS 4,337,552  7/1982  Iwase .............................. 452/1

Primary Examiner—Willis Little
Attorney, Agent, or Firm—Harrison & Egbert

[57] ABSTRACT

A machine which can automatically make a lengthwise cut in each of the opposite sides of leg shells along the center line in the direction of thickness of the crab legs irrespective of their size, thickness, shape, curve, etc. The machine comprises an upper conveyor belt and a lower conveyor belt, said belts carrying crab legs by holding them therebetween, the lower portion of the upper conveyor belt and the upper portion of the lower conveyor belt being adapted to move vertically symmetrically according to the vertical thickness of crab legs, a pair of circular saws being disposed horizontally movably on the opposite sides of said conveyor belts so that each of said circular saws is at equal distances from the lower portion of said upper conveyor belt and from the upper portion of said lower conveyor belt, each of said circular saws being always given a tendency to move inward.

9 Claims, 5 Drawing Sheets

MACHINE FOR AUTOMATICALLY CUTTING SHELLS OF CRAB LEGS

BACKGROUND OF THE INVENTION (1) Field of the Invention

The present invention relates to a machine for automatically cutting the shells of legs of crabs such as red rock crabs, dungeness crabs and hair crabs. More particularly the invention relates to a machine for automatically making a lengthwise cut in each of the opposite sides of leg shells.

(2) Description of the Prior Art

Crab legs vary in size, thickness, shape, curve, etc. There have been no machines so far which can automatically make a lengthwise cut in each of the opposite sides of leg shells along the center line in the direction of thickness of the crab legs irrespective of their size, thickness, shape, curve, etc.

BRIEF SUMMARY OF THE INVENTION

Boiled crab legs are very delicious and widely liked by consumers. However, they have hard shells. It takes a great deal of trouble to break their shells and take out the flesh. If a lengthwise cut is made in advance in each of the opposite sides of leg shells as shown in FIGS. 7 and 8, then crab legs will be easy to eat and the demand for them will much increase.

It is therefore an object of the invention to provide a machine which can automatically make lengthwise cut in each of the opposite sides of leg shells along the center line in the direction of thickness of the crab legs irrespective of their size, thickness, shape, curve, etc.

It is a another object of the invention to provide a machine which can cut only the shells of crab legs without cutting the flesh.

It is a further object of the invention to provide a machine which can cut the two opposite sides of leg shells very surely at desired positions.

It is a still further object of the invention to provide a machine which can cut even the shell of very short crab legs.

These and other object have been attained by a machine comprising an upper conveyor belt and a lower conveyor belt, said belts carrying crab legs by holding them therebetween, the lower portion of the upper conveyor belt and the upper portion of the lower conveyor belt being adapted to move vertically symmetrically according to the vertical thickness of crab legs, a pair of circular saws being disposed horizontally movably on the opposite sides of said conveyor belts so that each of said circular saws is at equal distances from the lower portion of said upper conveyor belt and from the upper portion of said lower conveyor belt, each of said circular saws being always given a tendency to move inward.

More particularly, the machine of the present invention comprises an upper conveyor belt and a lower conveyor belt, said belt carrying crab legs by holding them therebetween, a pulley on the inlet side of said upper conveyor belt being rotatably attached to one end of a pulley arm, said pulley arm being adapted to turn up and down, said pulley being always given a tendency to move downward, upper roller arms being disposed within said upper conveyor belt, lower roller arms being disposed within said lower conveyor belt, said upper and lower roller arms being adapted to turn up and down, each of said roller arms being provided at one end thereof with a gear, said gear of each of said upper roller arms being in engagement with said gear of each of said roller arms, an upper roller being rotatably attached to the end of each of said upper roller arms, a lower roller being rotatably attached to the other end of each of said lower roller arms, each of said upper rollers being adapted to push downward a lower portion of said upper conveyor belt, each of said lower rollers being adapted to push upward an upper portion of said lower conveyor belt, a pair of circular saw arms being disposed on the opposite sides of said conveyor belts, said circular saw arms being adapted to turn horizontally, each of said circular saw arms being provided at one end thereof with a circular saw driven by an electric motor, each of said circular saws being disposed at equal distances from the lower portion of said upper conveyor belt and from the upper portion of said lower conveyor belt, each of said circular saws being always given a tendency to move inward.

Said circular saws are always given a tendency to move inward preferably by a spring attached between said saws.

Each of said circular saws is preferably held between an upper circular guide plate and a lower circular guide plate so that the peripheral cutting portion of the saw protrudes from said circular guide plates.

A pair of guide levers are preferably disposed on the opposite sides of said conveyor belts so as to be positioned immediately before said circular saws, said guide levers being adapted to turn horizontally, each of said guide levers being always given a tendency to turn inward.

Said guide levers are always given a tendency to turn inward preferably by a spring attached between said guide levers.

Adjacent rollers within each of said conveyor belts are preferably connected with each other by means of a connecting member, said connecting member being provided with a rotatable auxiliary roller intermediately between said adjacent rollers.

The operation of the machine for automatically cutting the shells of crab legs according to the present invention will now be described.

To make a lengthwise cut in each of the opposite sides of leg shells, crab legs are held between the upper conveyor belt and the lower conveyor belt and sent toward the circular saws. At this time, since the pulley on the inlet side of said upper conveyor belt is rotatably attached to one end of the pulley arm, said pulley arm being adapted to turn up and down, said pulley being always given a tendency to move downward, the pulley moves up and down according to the vertical thickness of crab legs so as to bring the upper conveyor belt into contact with the crab legs. Therefore, the crab legs are sent in a state of being held between the upper and lower conveyor belts. The gear provided at one end of each upper roller arm is in engagement with the corresponding gear provided at one end of each lower roller arm, said roller arms being adapted to turn up and down, said roller being rotatably attached to the other end of each of said roller arms, each of said upper rollers being adapted to push downward a lower portion of said upper conveyor belt, each of said lower rollers being adapted to push upward an upper portion of said lower conveyor belt. Therefore, the lower portion of said upper conveyor belt and the upper portion of said lower conveyor belt move up and down vertically symmetrically along with the upper and lower rollers according to the vertical thickness of crab legs. Thus, said circular saws disposed at equal distances from the lower portion of said upper conveyor belt and from the upper portion of said lower conveyor belt make lengthwise cuts in the opposite sides of the leg shells always along the center line in the direction of thickness of the crab legs irrespective of their size, thickness, shape, curve, etc. Said circular saw arms disposed on the opposite sides of said conveyor belts are adapted to turn horizontally, each of said circular saws being always given a tendency to move inward. Therefore, the circular saws move in the horizontal directional according to the horizontal width of the crab legs so that the circular saws surely contact the opposite sides of the shells of the crab legs. Thus, the machine of the present invention can automatically make a lengthwise cut in each of the opposite sides of legs shells along the center line in the direction of thickness of the crab legs irrespective of their size, thickness, shape, curve, etc.

When the circular saws are given a tendency to move inward by a spring attached between the saws, the saws move in the horizontal direction by the force of the spring according to the horizontal width of the crab legs so that the saws surely contact the opposite sides of the shells of the crab legs.

When each of said circular saws is held between the upper circular guide plate and the lower circular guide plate so that the peripheral cutting portion of the saw protrudes from said circular guide plates, then only the peripheral cutting portion of the saw protruding from said circular guide plates makes a cut in the crab legs. Therefore, if the peripheral cutting portion of the saw is protruded from the circular guide plates according to the thickness of the shells of the crab legs, the saw makes a precise cut only in the shells of the crab legs without cutting the flesh.

When said guide levers are disposed on the opposite sides of said conveyor belts so as to be positioned immediately before said circular saws, said guide levers being adapted to turn horizontally, each of said guide levers being always given a tendency to turn inward, then the guide levers turn in the horizontal direction according to the horizontal width of the crab legs and adjust the position of the crab legs to the center line of the conveyor belts. Since the crab legs are thus sent to the circular saws in a state of being adjusted to the center line of the conveyor belts, the shells of the crab legs are cut very precisely at desired positions.

When said guide levers are given a tendency to turn inward by a spring attached between said guide levers, then the guide levers are turned by the force of the spring horizontally symmetrically according to the horizontal width of the crab legs.

When adjacent rollers within each of said conveyor belts are connected with each other by means of said connecting member, said connecting member being provided with said rotatable auxiliary roller intermediately between said adjacent rollers, then the crab legs are held through the upper and lower conveyor belts by the upper and lower auxiliary rollers between the adjacent rollers as well as by the adjacent rollers. Therefore, even very short crab legs are surely sent without slipping between the adjacent rollers at the time of cutting, etc. In the absence of said auxiliary rollers, very short crab legs do not directly receive the force of the adjacent rollers when the crab legs are in a position between the adjacent rollers. This means that the very short crab legs are liable to slip between the adjacent rollers at the time of cutting, etc. because they are not firmly held between the conveyor belts.

DETAILED DESCRIPTION

The present invention will now be described in detail with reference to the attached drawings.

Figure 1:
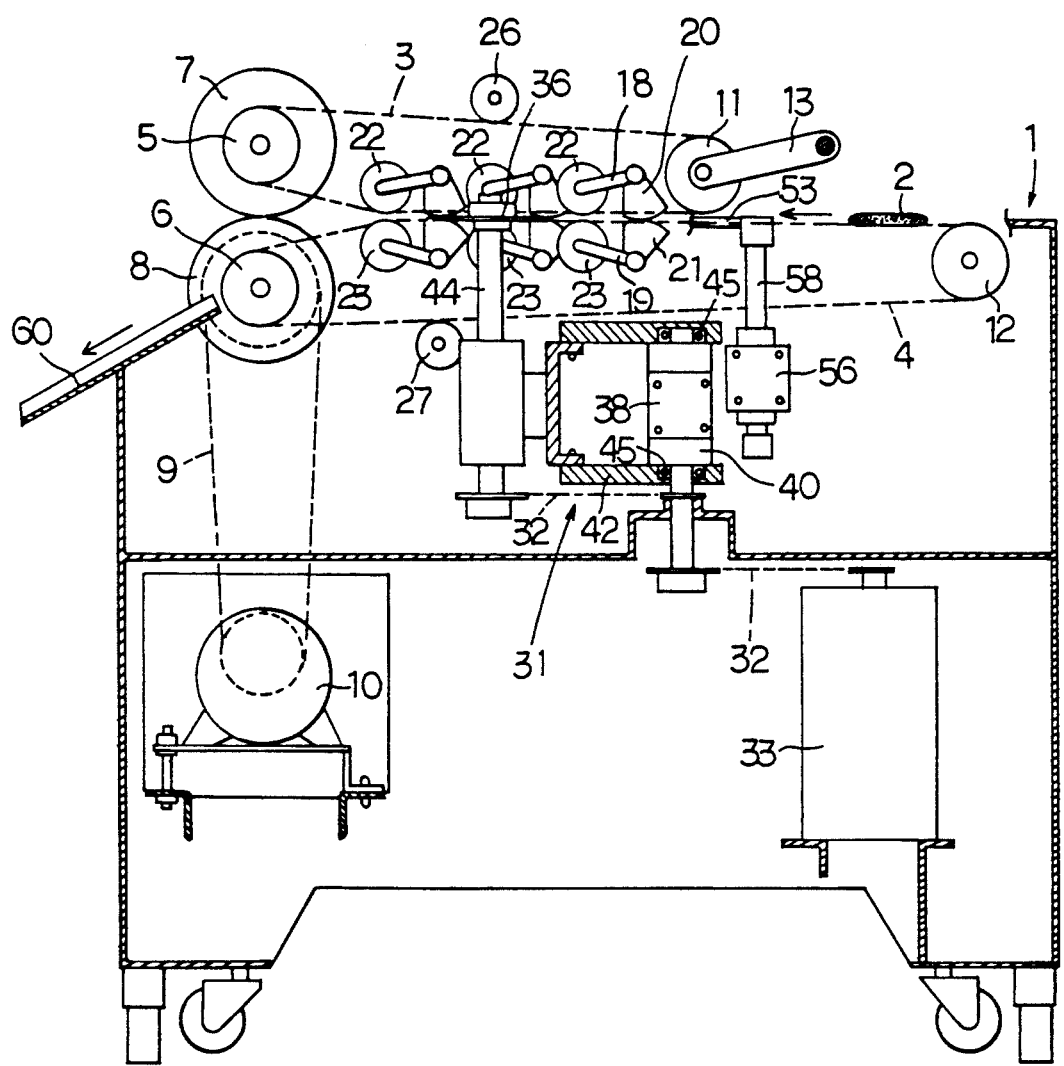
FIG. 1 is a front view of a machine for automatically cutting the shells of crabs legs according to the present invention.

Numeral 1 represents a frame of a machine for automatically cutting the shells of crab legs according to the present invention. Said frame 1 is provided with an upper conveyor belt 3 and a lower conveyor belt 4. Crab legs 2 are held between the upper conveyor belt 3 and the lower conveyor belt 4 and sent in this state. The upper conveyor belt 3 is driven by a driving pulley 5 disposed on the outlet side of the belt 3. The lower conveyor belt 4 is driven by a driving pulley 6 disposed on the outlet side of the belt 4. In FIG. 1, a gear 7 is fixed to the shaft of said driving pulley 5 of the upper conveyor belt 3, a gear 8 being fixed to the shaft of said driving pulley 6 of the lower conveyor belt 6, said gears 7 and 8 being in engagement with each other. One of said gears 7 and 8 is driven an electric motor 10 through a transmitting means 9 such as a chain and a belt.

Numeral 11 represents a pulley (driven pulley) provided on the inlet side of the upper conveyor belt 3. Numeral 12 represents a pulley (driven pulley) provided on the inlet side of the lower conveyor belt 4. Said pulley 12 provided on the inlet side of the lower conveyor belt 4 is fixed. Said pulley 11 provided on the inlet side of the upper conveyor belt 3 is rotatably attached to one end of a pulley arm 13, said pulley arm 13 being pivotally attached to the frame 1 so as to turn up and down. Said pulley 11 is always given a tendency to move downward by a pressing means 14 which may be for example a spring, preferably a coiled spring, attached between the pulley arm 13 and the frame 1.

Figure 2:
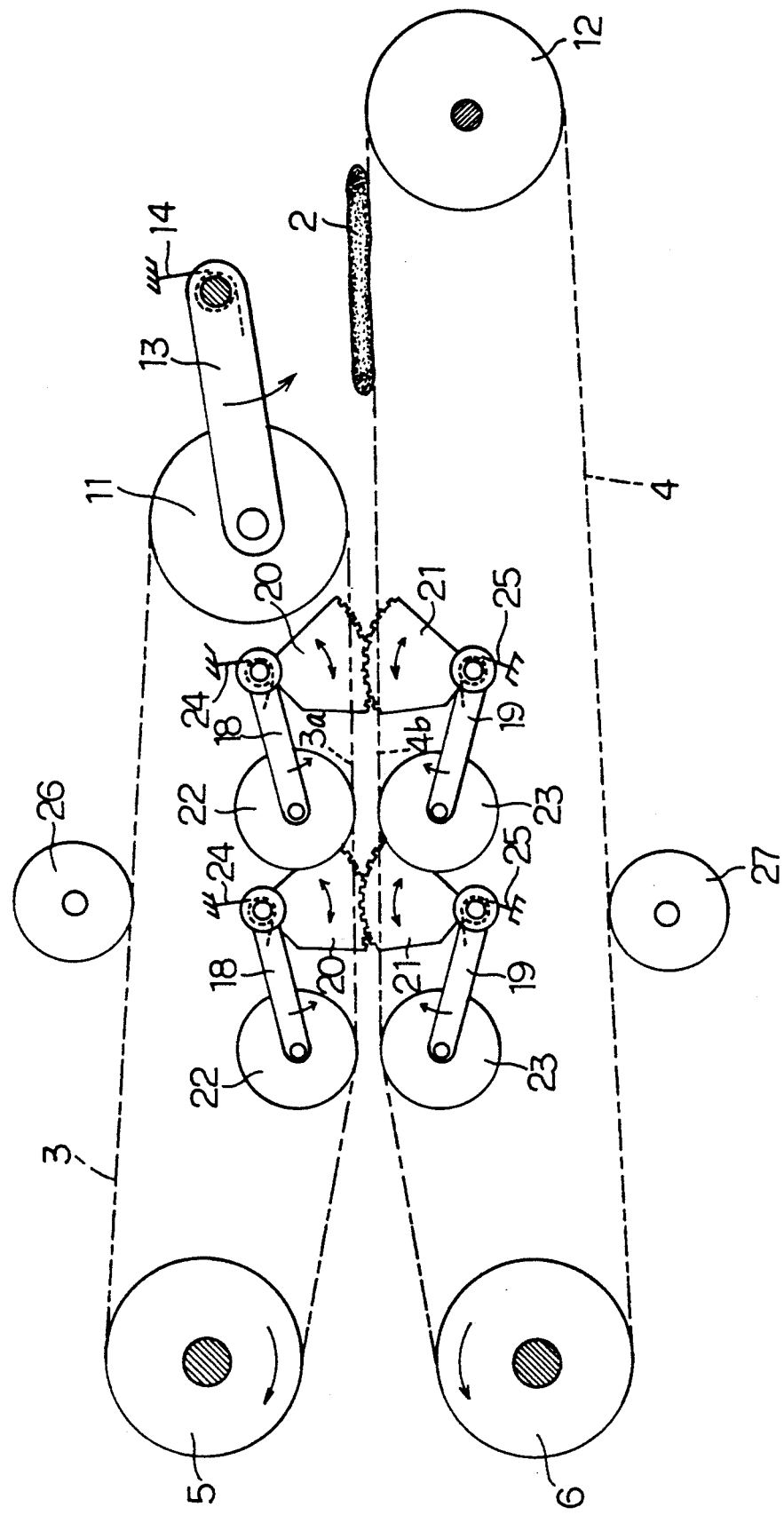
FIG. 2 is a front view schematically illustrating a feed mechanism in said machine.

Upper roller arms 18 are pivotally attached within the upper conveyor belt 3 to the frame 1 so as to turn up and down. Lower roller arms 19, corresponding to said upper roller arms 18, are pivotally attached within the lower conveyor belt 4 to the frame 1 so as to turn up and down. A gear 20 having the shape of a sector of a circle is attached to one end of each of said upper roller arms 18. A gear 21 having the shape of a sector of a circle is attached to one end of each of said lower roller arms 19. The gear 20 of each upper roller arm 18 is engaged with the gear 21 of each lower roller arm 19. An upper roller 22 is rotatably attached to the other end of each of said upper roller arms 18. A lower roller 23 is rotatably attached to the other end of each of said lower roller arms 19. Each of said upper rollers 22 is adapted to push downward a lower portion 3a of said upper conveyor belt 3 by a pushing means 24. Each of said lower rollers 23 is adapted to push upward an upper portion 4a of said lower conveyor belt 4 by a pushing means 25. The pushing means 24 and 25 may be for example a spring, preferably a coiled spring, attached between the roller arms 18, 19 and the frame 1. In FIG. 1 there are three pairs of rollers 22 and 23, while in FIG. 2 there are two pairs of them. Numeral 26 represents a tension pulley for the upper conveyor belt 3. Numeral 27 represents a tension pulley for the lower conveyor belt 4.

Figure 3:
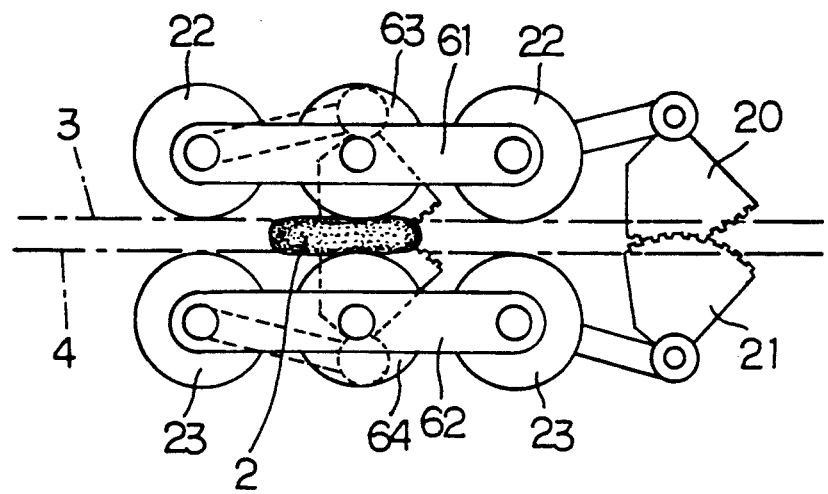
FIG. 3 is a front view showing auxiliary rollers provided between adjacent rollers.

In an embodiment shown in FIG. 3, adjacent upper rollers 22 within said upper conveyor belt 3 are connected with each other by means of connecting member 61, said connecting member 61 being provided with a rotatable auxiliary roller 63 intermediately between said adjacent upper rollers 22. Also, adjacent lower rollers 23 within said lower conveyor belt 4 are connected with each other by means of a connecting member 62, said connecting member 62 being provided with a rotatable auxiliary roller 64 intermediately between said adjacent lower rollers 23.

Figure 4:
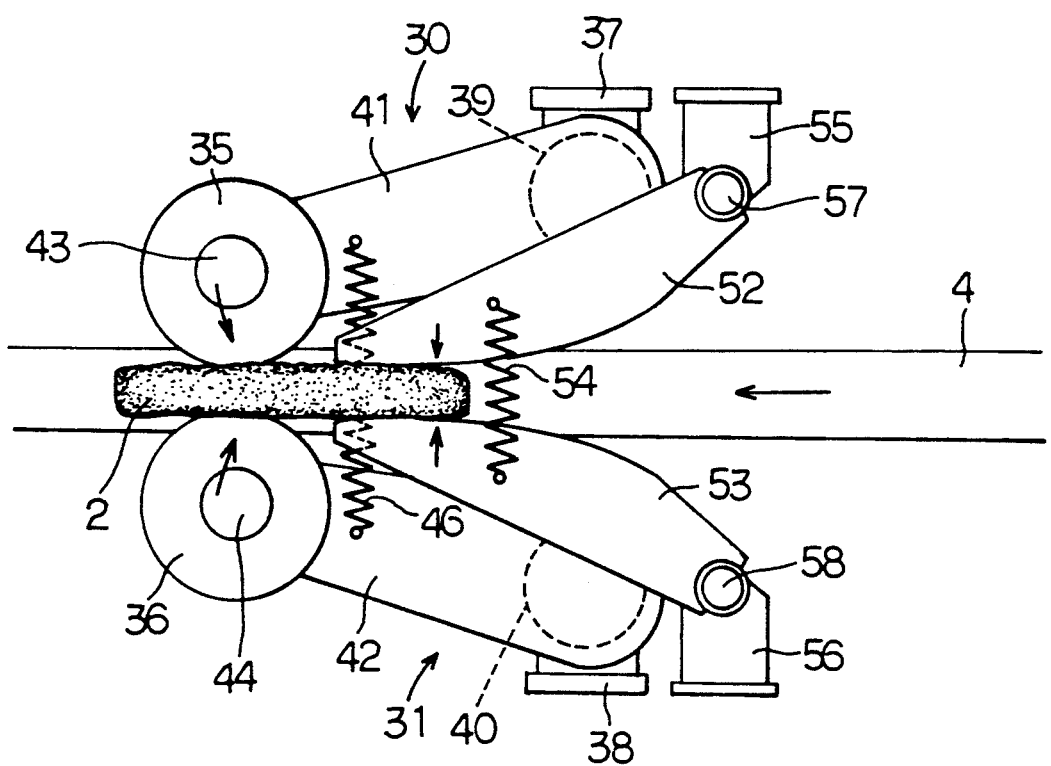
FIG. 4 is a plan view showing circular saws, guide levers, etc.
Figure 5:
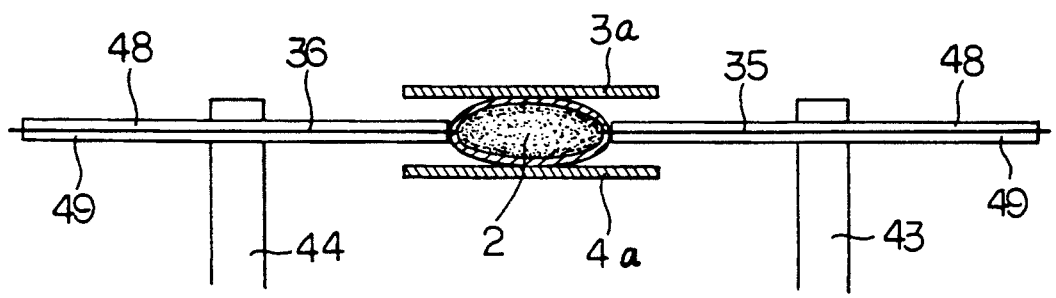
FIG. 5 is a side view showing the relationship between said circular saws upper and lower conveyor belts and a crab leg.

A pair of circular saw arms 30 and 31 are disposed on the opposite sides of said conveyor belts 3 and 4, said circular saw arms 30 and 31 being pivotally attached to the frame 1 so as to to turn horizontally. In an embodiment shown in FIGS. 1 and 4, said circular saw arm 30 (31) comprises a rotatable member 41 (42) being attached through bearings 45 to a fixed member 39 (40), said fixed member 39 (40) being fixed to the frame 1 by means of a fixing member 37 (38). Numeral 43 (44) represents a vertical shaft attached to the free end of said rotatable member 41 (42). Said vertical shaft 43 (44) supports a circular saw 35 (36) driven by en electric motor 33 through transmitting means 32 such as chains and belts. Each of said circular saws 35 and 36 is attached to each of said vertical shafts 43 and 44 so that each of said circular saws 35 and 36 is at equal distances from the lower portions 3a of said upper conveyor belt 3 and from the upper portion 4a of said lower conveyor belt 4 as shown in FIG. 5. Each of said circular saws 35 and 36 is always given a tendency to move inward preferably by a spring 46 attached between said circular saws 35 and 36 or between said circular saw arms 30 and 31 as shown in FIG. 4. The circular saws 35 and 36 are preferably disposed between said pairs of rollers 22 and 23.

Figure 6:
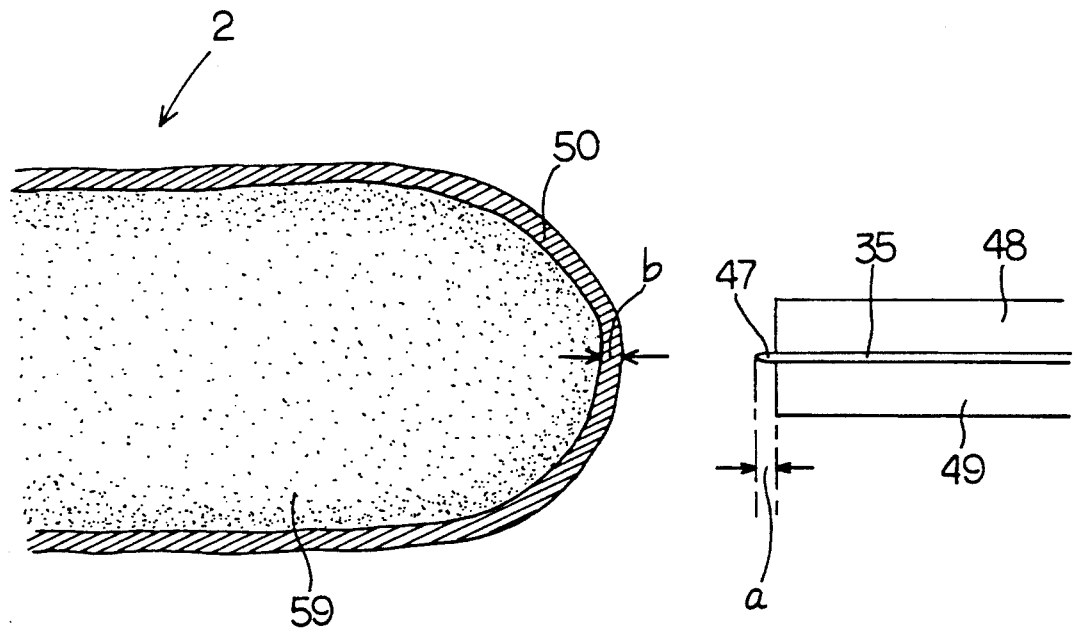
FIG. 6 is an enlarged view showing the relationship between a circular saw and a crab leg.
Figure 7:
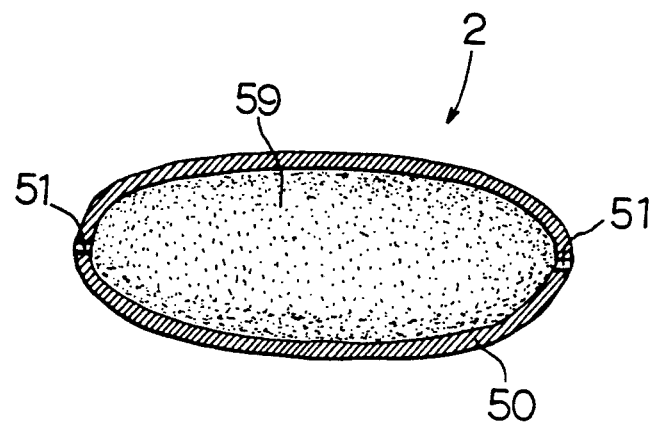
FIG. 7 is an enlarged sectional view of a crab leg having cuts in its shell.

Each of said circular saws 35 and 36 is preferably held between an upper circular guide plate 48 and a lower circular guide plate 49 so that the peripheral cutting portion 47 of the saw protrudes from said circular guide plates 48 and 49. If th e size "a" of the peripheral cutting portion 47 protruding from said circular guide plates 48 and 49 is equal to the thickness "b" of the shell 50 of a crab leg 2 (See FiG. 6.), then the saw will make a cut only in the shell 50 of the crab leg 2 without cutting the flesh 59. FIG. 7 shows a cut 51 made in each of the opposite sides of the shell 50.

A pair of guide levers 52 and 53 are disposed on the opposite sides of said conveyor belts 3 and 4 so as to be positioned immediately before said circular saws 35 and 36. Said guide levers 52 and 53 are adapted to turn horizontally. Each of said guide levers 52 and 53 are always given a tendency to turn inward preferably by a spring 54 attached between said guide levers 52 and 53. In an embodiment shown inFIGS. 1 and 4, each of said guide levers 52 and 53 is rotatably attached to the upper end of each of vertical shafts 57 and 58 which are fixed to the frame 1 by means of fixing members 55 and 56.

Figure 8:
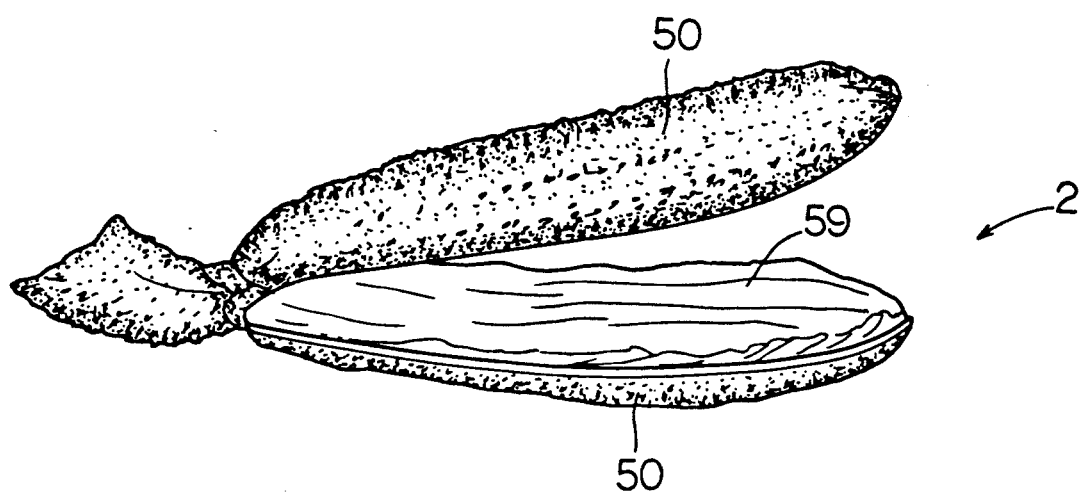
FIG. 8 is a perspective view showing a finished crab leg.

Numeral 60 represents a chute disposed on the outlet side of said conveyor belts 3 and 4. If a crab leg 2 is given a lengthwise cut 51 on the opposite sides of the shell 50 by the machine of the present invention as shown in FIG. 7, then the shell 50 easily breaks in two as shown in FIG. 8 so that the flesh 59 inside can be easily taken out.

What is claimed is:

1. A machine for automatically cutting the shells of crab legs, comprising an upper conveyor belt and a lower conveyor belt, said belts carrying crab legs by holding them therebetween, a pulley on the inlet side of said upper conveyor belt being rotatably attached to one end of a pulley arm, said pulley arm being adapted to turn up and down, said pulley being always given a tendency to move downward, upper roller arms being disposed within said upper conveyor belt, lower roller arms being disposed within said lower conveyor belt, said upper and lower roller arms being adapted to turn up and down, each of said roller arms being provided at one end thereof with a gear, said gear of each of said upper roller arms being in engagement with said gear of each of said lower roller arms, an upper roller being rotatably attached to the other end of each of said upper roller arms, a lower roller being rotatably attached to the other end of each of said lower roller arms, each of said upper rollers being adapted to push downward a lower portion of said upper conveyor belt, each of said lower rollers being adapted to push upward an upper portion of said lower conveyor belt, a pair of circular saw arms being disposed on the opposite sides of said conveyor belts, said circular saw arms being adapted to turn horizontally, each of said circular saw arms being provided at one end thereof with a circular saw driven by an electric motor, each of said circular saws being disposed at equal distances from the lower portion of said upper conveyor belt and from the upper portion of said lower conveyor belt, each of said circular saws being always given a tendency to move inward, and a pair of guide levers disposed on the opposite sides of said conveyor belts so as to be positioned immediately before said circular saws, said guide levers being adapted to turn horizontally, each of said guide levers being always given a tendency to turn inward.

2. A machine for automatically cutting the shells of crab legs as claimed in claim 1, wherein said circular saws are always given a tendency to move inward by a spring attached between said saws.

3. A machine for automatically cutting the shells of crab legs as claimed in claim 1, wherein each of said circular saws is held between an upper circular guide plate and a lower circular guide plate so that the peripheral cutting portion of the saw protrudes from said circular guide plates.

4. A machine for automatically cutting the shells of crab legs as claimed in claim 1, wherein said guide levers are always given a tendency to turn inward by a spring attached between said guide levers.

5. A machine for automatically cutting the shells of crab legs as claimed in claim 2, wherein adjacent rollers within each of said conveyor belts are connected with each other by means of a connecting member, said connecting member being provided with a rotatable auxiliary roller intermediately between said adjacent rollers.

6. A machine for automatically cutting the shells of crab legs as claimed in claim 3, wherein adjacent rollers within each of said conveyor belts are connected with each other by means of a connecting member, said connecting member being provided with a rotatable auxiliary roller intermediately between said adjacent rollers.

7. A machine for automatically cutting the shells of crab legs as claimed in claim 2, wherein each of said circular saws is held between an upper circular guide plate and a lower circular guide plate so that the peripheral cutting portion of the saw protrudes from said circular guide plates.

8. A machine for automatically cutting the shells of crab legs as claimed in claim 4, wherein adjacent rollers within each of said conveyor belts are connected with each other by means of a connecting member, said connecting member being provided with a rotatable auxiliary roller intermediately between said adjacent rollers.

9. A machine for automatically cutting the shells of crab legs, comprising an upper conveyor belt and a lower conveyor belt, said belts carrying crab legs by holding them therebetween, a pulley on the inlet side of said upper conveyor belt being rotatably attached to one end of a pulley arm, said pulley arm being adapted to turn up and down, said pulley being always given a tendency to move downward, upper roller arms being disposed within said upper conveyor belt, lower roller arms being disposed within said lower conveyor belt, said upper and lower roller arms being adapted to turn up and down, each of said roller arms being provided at one end thereof with a gear, said gear of each of said upper roller arms being in engagement with said gear of each of said lower roller arms, an upper roller being rotatably attached to the other end of each of said upper roller arms, a lower roller being rotatably attached to the other end of each of said lower roller arms, each of said upper rollers being adapted to push downward a lower portion of said upper conveyor belt, each of said lower rollers being adapted to push upward an upper portion of said lower conveyor belt, a pair of circular saw arms being disposed on the opposite sides of said conveyor belts, said circular saw arms being adapted to turn horizontally, each of said circular saw arms being provided at on end thereof with a circular saw driven by an electric motor, each of said circular saws being disposed at equal distances from the lower portion of said upper conveyor belt and from the upper portion of said lower conveyor belt, each of said circular saws being always given a tendency to move inward, wherein adjacent rollers within each of said conveyor belts are connected with each other by means of a connecting member, said connecting member being provided with a rotatable auxiliary roller intermediately between said adjacent rollers.

* * * * *